(12) United States Patent
Silverman et al.

(10) Patent No.: US 10,944,603 B2
(45) Date of Patent: Mar. 9, 2021

(54) WIRELESS DEVICE PROFILING, CLASSIFYING, AND ONBOARDING USING BASEBAND PROFILES OF THE WIRELESS DEVICE

(71) Applicant: Cisco Technology, Inc., San Jose, CA (US)

(72) Inventors: Matthew A. Silverman, Shaker Heights, OH (US); Amir H. Kamalizad, Menlo Park, CA (US); Jie C. Jiang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 15/982,257

(22) Filed: May 17, 2018

(65) Prior Publication Data

US 2019/0356520 A1 Nov. 21, 2019

(51) Int. Cl.
*H04L 27/00* (2006.01)
*H04W 76/11* (2018.01)
(Continued)

(52) U.S. Cl.
CPC .... *H04L 27/0012* (2013.01); *H04L 25/03828* (2013.01); *H04W 48/10* (2013.01);
(Continued)

(58) Field of Classification Search
None
See application file for complete search history.

(56) References Cited

U.S. PATENT DOCUMENTS 9,384,075 B2  7/2016  Kim
9,596,603 B2  3/2017  Spencer et al.
(Continued)

FOREIGN PATENT DOCUMENTS

WO  2016118979 A2  7/2016

OTHER PUBLICATIONS

Shikhar Prasad Acharya, "Detection and recognition of R/F devices based on their unintended electromagnetic emissions using stochastic and computational intelligence methods", Doctoral Dissertations, http://scholarsmine.mst.edu/doctoral_dissertations/2373, Spring 2015, 112 pages.

(Continued)

*Primary Examiner* — Robert C Sheibel
*Assistant Examiner* — Gautam Sharma
(74) *Attorney, Agent, or Firm* — Edell, Shapiro & Finnan, LLC

(57) ABSTRACT

Modulated radio frequency (RF) packets are received from a wireless device, and converted to modulated baseband packets. Baseband parameters are derived from the modulated baseband packets. A baseband profile including the baseband parameters is created for the wireless device. A database including baseband profiles of wireless devices is accessed. The baseband profiles are classified under known device types based on baseband parameters included in the baseband profiles. The baseband parameters of the baseband profile are compared to corresponding baseband parameters of the baseband profiles in the database. If the comparing indicates a match between the baseband profile and one of the baseband profiles, the wireless device is classified under the known device type of the one of the baseband profiles, and the baseband profile is stored in the database under the known device type.

20 Claims, 13 Drawing Sheets

(51) Int. Cl.
*H04W 48/16* (2009.01)
*H04W 48/10* (2009.01)
*H04L 25/03* (2006.01)
*H04W 84/18* (2009.01)

(52) U.S. Cl.
CPC ............ *H04W 48/16* (2013.01); *H04W 76/11* (2018.02); *H04W 84/18* (2013.01)

(56) References Cited

U.S. PATENT DOCUMENTS

| | | | |
|---|---|---|---|
| 9,774,604 B2 | 9/2017 | Zou et al. | |
| 2009/0258597 A1* | 10/2009 | Chen ..................... | H04W 16/14 455/41.2 |
| 2009/0322472 A1* | 12/2009 | MacDonald .......... | G01K 1/024 340/5.1 |
| 2010/0050259 A1* | 2/2010 | Christofferson ...... | H04W 12/08 726/23 |
| 2015/0019714 A1 | 1/2015 | Shaashua et al. | |
| 2015/0350914 A1* | 12/2015 | Baxley ................. | H04W 12/08 726/11 |
| 2015/0373001 A1 | 12/2015 | Schatzmann et al. | |
| 2016/0127931 A1* | 5/2016 | Baxley ................. | G06F 16/285 455/67.16 |
| 2016/0301707 A1 | 10/2016 | Cheng et al. | |
| 2016/0308861 A1 | 10/2016 | Ameling et al. | |
| 2016/0338145 A1 | 11/2016 | Bhanage | |
| 2017/0359417 A1 | 12/2017 | Chen et al. | |
| 2018/0109551 A1 | 4/2018 | Wetterwald et al. | |
| 2019/0149519 A1* | 5/2019 | Bajekal ................. | H04W 84/18 726/4 |

OTHER PUBLICATIONS

Patrick Nelson, "Using radio frequency noise detection to identify electronic equipment", networkworld.com, May 2016, about:reader?url=https://www.networkworld.com/article/3069280/data-c . . . , 4 pages.

Costa, et al., "Cloud2Bubble: Enhancing Quality of Experience in Mobile Cloud Computing Settings", MCS'12, Jun. 25, 2012, Low Wood Bay, Lake District, UK., 8 pages, 2012, ACM.

* cited by examiner

| Feature | Value | Unit |
|---|---|---|
| a. MAC Address | AA:BB:CC:DD:EE:FF | |
| b. Timestamps | 0:00 | msec (0 is midnight) |
| c. Packet Duration on Air | 0:00 | usec |
| d. Device Protocol | IEEE 802.11a | |
| e. RSSI | -50 | dBM |
| f. Ambient Temperature | 25 | Celsius |
| g. Center Frequency | 5500 | MHz |
| h. BW | 20 | MHz |
| i. Modulation and coding scheme | 2 | |
| j. SNR per subcarrier | [18 20 21 21 .. 21 18] | Array with 48 values in dB |
| k. CSI | [(a0,theta0) (a1,theta1) ... (a55,theta55)] | array with 56 complex values (including edge subcarriers to find filter roll off), this will have aplitude and phase |
| l. Estimated Carrier Frequency Offset | -63.5 | KHz |
| m. Estimated Timing Offset | 400 | Hz (estimated from phase error in each symbol) |
| n. Estimated IQ Mismatch Phase | 1 | degree |
| o. Estimated IQ Mismatch amplitude | 0.3 | dB |
| p. Transient Metrics | Dimensions to be determined | Discrete wavelet transform or packet ramp up and ramp down samples |
| q. distance Estimate based on RSSI | 15 | ft |
| r. AoA estimate based on Multi antenna processing | 20 | degrees (AP orientation is known) |
| s. Payload | | Actual contents of the packet |

502            504            506

900

902
Device Type Mismatch - Detected new type of wireless device: ID <XYZ>

Please enter new device type classification: _____
904

Device Type Mismatch - Detected new type of wireless device: ID <XYZ>

Please enter new device type classification: _____

Please enter onboarding parameters: _____

FIG.12

WIRELESS DEVICE PROFILING, CLASSIFYING, AND ONBOARDING USING BASEBAND PROFILES OF THE WIRELESS DEVICE

TECHNICAL FIELD

The present disclosure relates to baseband processing of transmissions from wireless devices.

BACKGROUND

Internet-of-Things (IoT) devices, such as sensors and monitors, are deployed in large numbers across geographically dispersed regions. Different groups of the IoT devices may operate in different networks. When the IoT devices transition from inactive to active, i.e., begin transmitting modulated RF packets, the IoT devices and the networks with which they intend to participate need to be provisioned so that the IoT devices can join the networks. Conventional techniques require network administrators to identify the active IoT devices and their respective networks, and then manually provision the networks and/or IoT devices so that the IoT devices can participate in the networks. Such manual intervention is time-prohibitive given the large number of IoT devices, networks, and frequency with which the IoT devices transition back-and-forth between inactive and active states.

BRIEF DESCRIPTION OF THE DRAWINGS

FIG. 5 is an illustration of a baseband profile generated by the AP for the wireless device, according to an example embodiment.

FIG. 9 is an illustration of a display page generated in the method of FIG. 8, according to an example embodiment.

FIG. 12 is an illustration of a display page generated in the method of FIG. 11, according to an example embodiment.

DESCRIPTION OF EXAMPLE EMBODIMENTS

Overview

In an embodiment, modulated radio frequency (RF) packets are received from a wireless device, and converted to modulated baseband packets. Baseband parameters are derived from the modulated baseband packets. A baseband profile including the baseband parameters is created for the wireless device. A database including baseband profiles of wireless devices is accessed. The baseband profiles are classified under known device types based on baseband parameters included in the baseband profiles, such that baseband profiles in the database having corresponding baseband parameters that match or mismatch each other are classified under the same or different device types, respectively. The baseband parameters of the baseband profile are compared to corresponding baseband parameters of the baseband profiles in the database. If the comparing indicates a match between the baseband profile and one of the baseband profiles, the wireless device is classified under the known device type of the one of the baseband profiles, and the baseband profile is stored in the database under the known device type.

Example Embodiments

Figure 1:
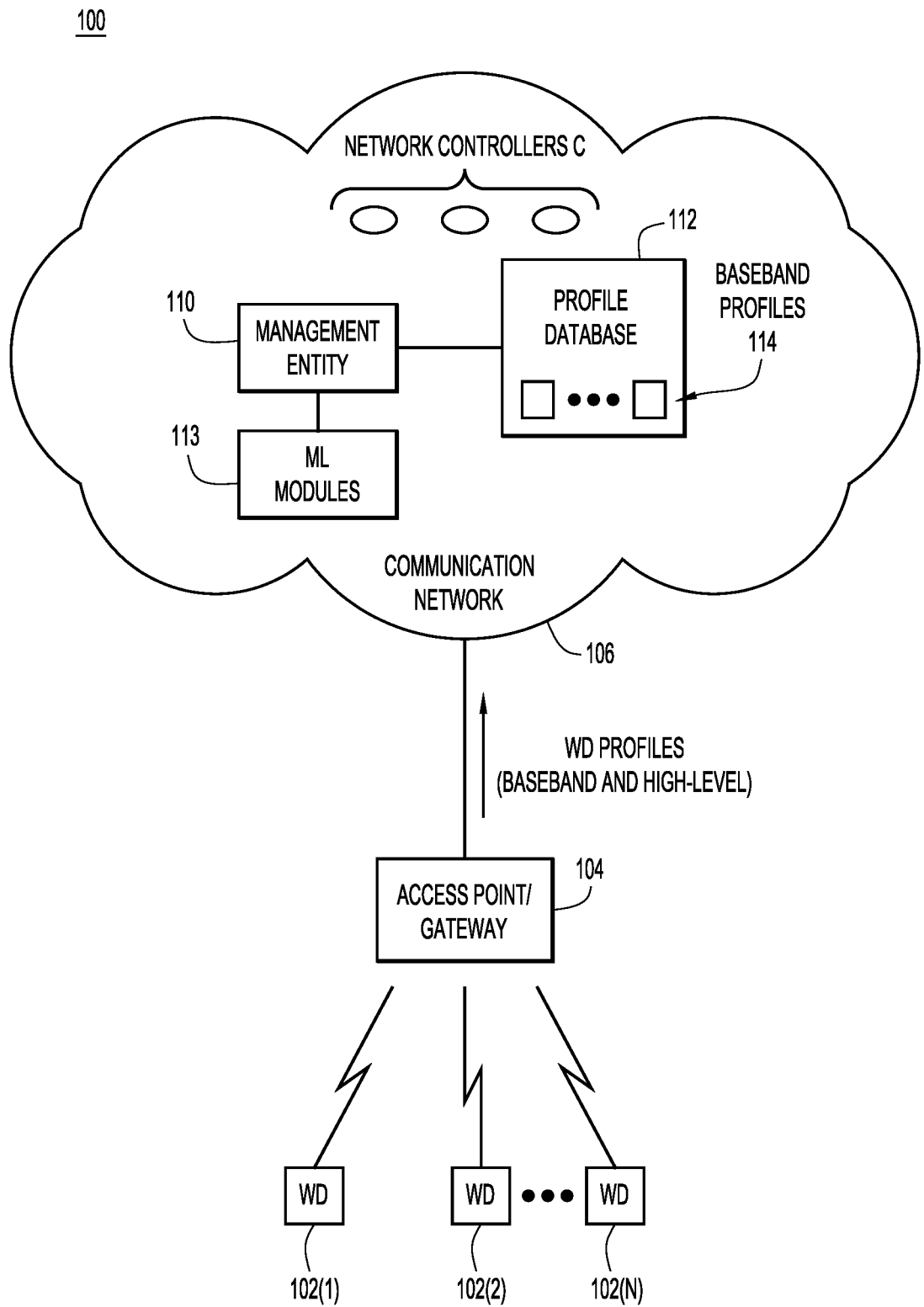
FIG. 1 is a block diagram of a network environment in which embodiments directed to profiling, classifying, and onboarding wireless devices may be performed, according to an example embodiment.

With reference to FIG. 1, there is a block diagram of an example network environment 100 in which embodiments directed to profiling, classifying, and onboarding wireless devices based on baseband profiles may be performed. Network environment 100 includes multiple wireless devices (WDs) 102(1)-102(N) (collectively referred to as "wireless devices 102" or "client devices 102") joined in one or more local area networks (LANs), and a wireless access point (AP) 104 configured to communicate wirelessly with the wireless devices. Wireless devices 102 and AP 104 are configured to communicate with each other in accordance with any known or hereafter developed wireless communication standard, such as any of the IEEE 802.11-based standards. Network environment 100 includes a communication network 106 connected to the AP 104 via a wired and/or wireless communication link, such that the AP serves as a combined AP-gateway for wireless devices 102 to network 106. Network 106 may include one or more wide area networks (WANs), such as the Internet, and one or more LANs, which may be wired or wireless. FIG. 1 shows only one wireless access point; however, it is understood that there may be many wireless access points in other examples.

Network environment 100 also includes a cloud-based management entity 110, a cloud-based profile database 112, and machine learning (ML) models 113 each accessible to the management entity and AP 104. Profile database 112 stores baseband profiles 114 for and associated with corresponding ones of remote devices 102. Network environment 100 may also include one or more (local area) network (LAN) controllers C to control AP 102 and particular networks in which wireless devices 102 may participate. Management entity 110 and AP 104 may each be configured to communicate with LAN controllers C. AP 104, management entity, profile database 112, and controllers C may communicate with each other using known or hereafter developed communication techniques, including, but not limited to, the transaction control protocol (TCP)/Internet Protocol (IP) suite, and so on.

Wireless devices 102 may include, but are not limited to, laptop computers, smartphones, tablets, and Internet-of-Things (IoT) devices configured to communicate wirelessly with AP 104. The IoT devices may include IoT controllers, sensors, and actuators/motors embedded in home/building appliances, health-related equipment, industrial monitoring equipment, retail monitoring, manufacturing, and the like. For example, the IoT devices may include heart rate monitors, blood pressure monitors, temperature sensors, pressure sensors, flow sensors, radio frequency (RF) identifier (ID) (RFID) tags, and so on.

Figure 2:
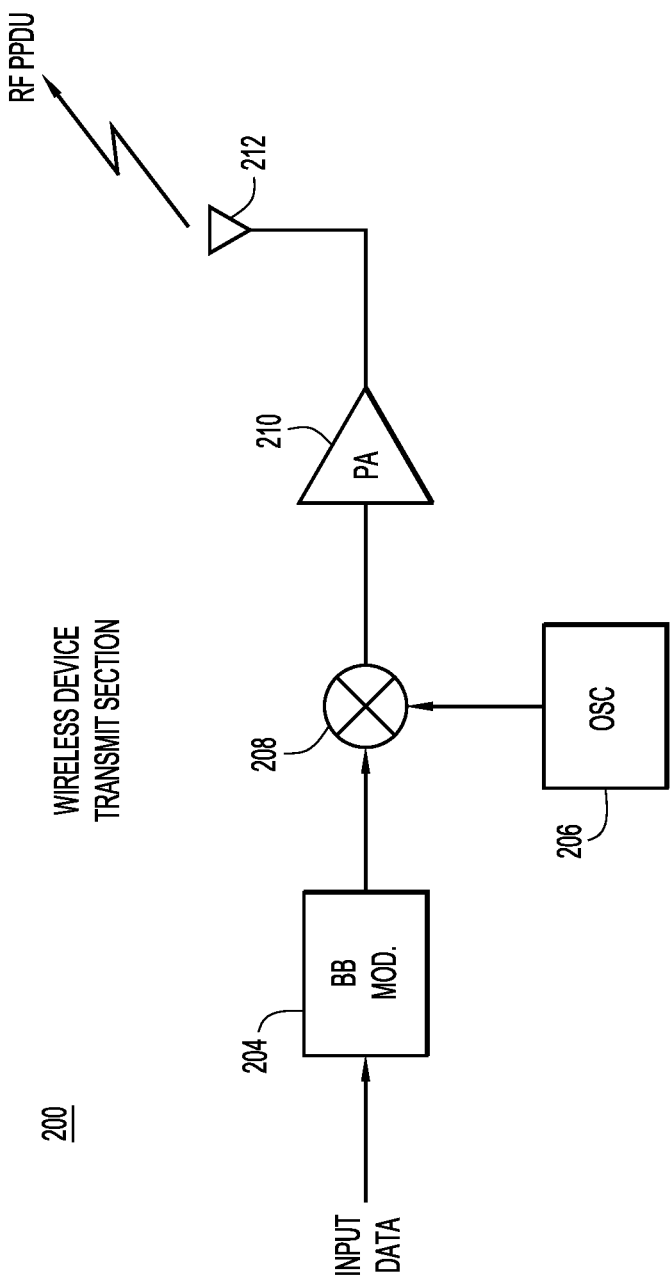
FIG. 2 is a block diagram of a generic transmit section for a wireless device of FIG. 1, according to an example embodiment.

With reference to FIG. 2, there is a block diagram of a generic transmit section for each of wireless devices 102. Transmit section 200 includes a baseband (BB) modulator (Mod) 204 to convert input data (e.g., from a sensor) to modulated baseband packets based on a frequency from an oscillator 206. In an example, the modulated baseband packets may be baseband Physical Layer Convergence Procedure (PLCP) Protocol data units (PPDUs), including orthogonal frequency-division multiplexing (OFDM) symbols and carrier frequencies/tones associated with the symbols. Transmit section 200 also includes an upconverter 208 to convert the modulated baseband packets to modulated RF packets based on a frequency from oscillator 206, and a power amplifier (PA) 210 to amplify the modulated RF packets. An antenna 212 wirelessly transmits the amplified modulated RF packets, e.g. as RF PPDUs.

Heating of transmit section 200 due to transmission of the RF PPDUs significantly impacts modulation characteristics of the modulated baseband and modulated RF PPDUs. Specifically, the heating impacts the frequency of oscillator 206 and gain of power amplifier 210, and thus affects carrier frequency, phase, and amplitude responses of the modulated RF PPDUs. Wireless devices that use the same types of transmit sections, e.g., oscillators and power amplifiers, react the same as each other with respect to their carrier frequency, phase, and amplitude responses, while wireless devices that use different types of oscillators and power amplifiers react differently from each other. The amount of heating that a given wireless device experiences depends on both an environment in which the wireless device operates, i.e., an ambient temperature of the environment, and self-heating of the wireless device due to a transmit duty cycle and an RF transmit power level. The higher the duty cycle and the power level, the hotter the wireless device becomes.

Wireless devices 102 each exhibit consistent time-dependent carrier frequency, phase, and amplitude responses versus self-heating and ambient temperature, which is also consistent across wireless devices that use, for example, the same types of oscillators, power amplifiers, printed circuits, and passive components. Thus, wireless devices 102 each exhibit consistent carrier frequency, phase, and amplitude responses versus transmit duty cycle, time between PPDU transmissions, and so on. Embodiments presented herein take advantage of the aforementioned response consistency in order to profile wireless devices 102, classify the profiled devices, and perform certain actions with respect to the classified wireless devices, such as onboarding the wireless devices, as described below.

According to embodiments presented herein, AP 104 creates profiles for wireless devices 102 based on RF transmissions from the wireless devices. This is referred to as profiling wireless devices 102. The profiles include baseband profiles, and may also include higher-level profiles or signatures for wireless devices 102. AP 104 may classify wireless devices 102 based on their baseband profiles 114 stored in database 112, or may send the baseband profiles to management entity 110 for classifying by the management entity. This is referred to as classifying wireless devices 102. Additionally, management entity 112 may perform onboarding of wireless devices 102 based on results of the classifying. This is referred to as onboarding the wireless devices. Profiling, classifying, and onboarding of wireless devices 102 are now described below in sequence.

Profiling Wireless Devices

Figure 3:
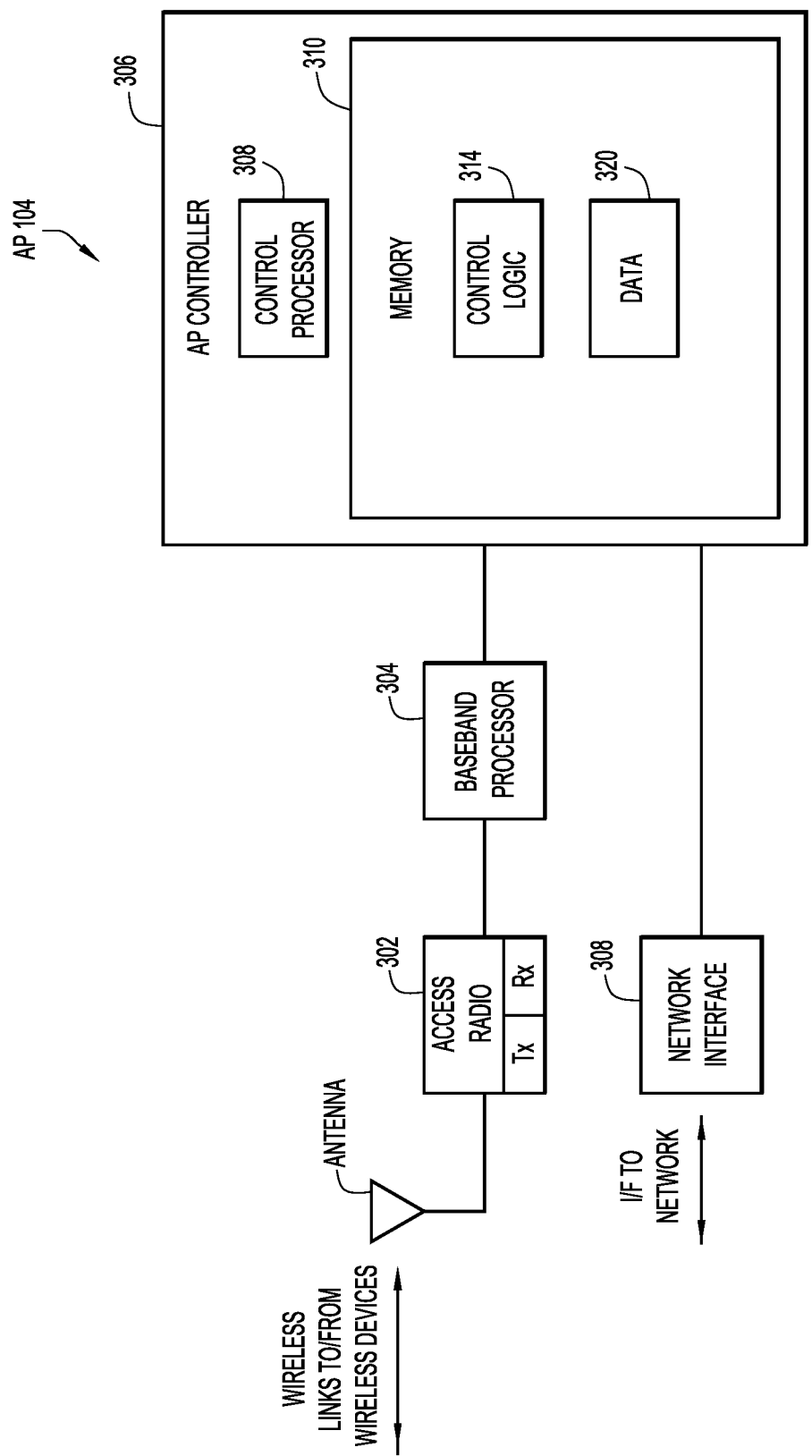
FIG. 3 is a high-level block diagram of a wireless access point (AP) of FIG. 1, according to an example embodiment.

Embodiments presented herein employ AP 104 to profile the wireless devices based on their transmission characteristics. With reference to FIG. 3, there is an illustration of AP 104, according to an embodiment. AP 104 includes a wireless access radio 302 including a radio transmitter (TX) and a radio receiver (RX) coupled to one or more antennas to transmit/receive wireless signals to/from wireless devices 102, a baseband processor 304 (described in detail below in connection with FIG. 14) coupled to the access radio, an AP controller 306 coupled to the baseband processor and configured to perform high-level control of the AP and other operations describe herein, and a network interface 308 coupled to the AP controller and that enables the AP to connect to and communicate with network 106. Wireless radio 302 and baseband processor 304 may each be configured to operate according to the IEEE 802.11 wireless standards. Network interface 308 may be a wired interface (e.g., an Ethernet interface) to connect with a wired network, and may also include a wireless interface.

AP controller 306 includes a processor 308 and memory 310. Processor 308 may include a microcontroller or microprocessor, for example, configured to execute software instructions stored in memory 310. Memory 310 may comprise read only memory (ROM), random access memory (RAM), or other physical/tangible (e.g., non-transitory) memory storage devices. Thus, in general, memory 310 may comprise one or more computer readable storage media (e.g., a memory device) encoded with software comprising computer executable instructions and when the software is executed (by processor 308) it is operable to perform operations described herein. For example, memory 310 stores or is encoded with instructions for control logic 314 to perform overall control of AP 104 according to the operations described herein.

Memory 310 also stores information/data 320 used and generated by logic 314, such as baseband profiles generated by AP 104, a local copy of profile database 112, and so on.

In a receive direction, radio receiver RX receives via the antenna (or multiple antennas) an RF signal (e.g., RF PPDUs) transmitted by a wireless device, frequency downconverts the RF signal to a baseband signal (e.g., baseband PPDUs), and provides the baseband signal to baseband processor 304. Baseband processor 304 performs baseband processing on the baseband signal (e.g., demodulation/decoding of the baseband PPDUs), to produce baseband processing results including baseband parameters, and provides the results to AP controller 306. In a transmit direction, baseband processor 304 converts data from AP controller 306 to baseband modulated data (e.g., baseband PPDUs), and provides the baseband modulated data to radio transmitter TX. Transmitter TX frequency up-converts the baseband modulated data to an RF signal (e.g., RF PPDUs), and transmits the RF signal via the antenna (or multiple antennas).

Figure 4:
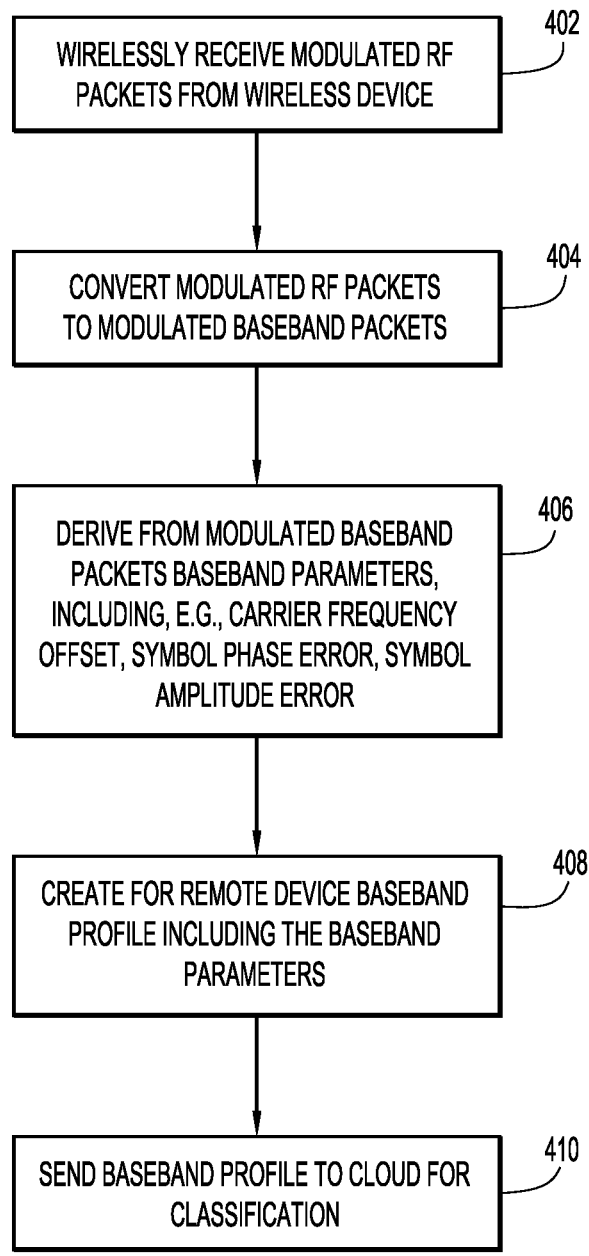
FIG. 4 is a flowchart of a method of baseband profiling of a wireless device performed by the AP, according to an example embodiment.

With reference to FIG. 4, there is a flowchart of an example method 400 of baseband profiling (e.g., a creating a baseband profile) for a wireless device (e.g., one of wireless devices 102) performed by AP 104. AP 104 may perform method 400 across all of wireless devices 102.

At 402, AP 104 wirelessly receives a sequence of modulated RF packets from the wireless device. In an example, the modulated RF packets include RF PPDUs formatted in accordance with the IEEE 802.11 wireless standards so as to include symbols and carrier frequencies/tones associated with OFDM modulation.

At 404, AP 104 (e.g., radio RX) frequency down-converts the received sequence of modulated RF packets to a corresponding sequence of modulated baseband packets. For example, and as described in connection with FIG. 14 below, AP 104 converts the modulated RF packets to a sequence of in-phase (I) and quadrature (Q) samples of baseband symbols and carrier frequencies/tones of the modulated baseband packets.

At 406, AP 104 (e.g., baseband processor 304) processes the sequence of modulated baseband packets. Specifically, AP 104 derives from the IQ samples of the sequence of modulated baseband packets baseband parameters. The baseband parameters may include, but are not limited to, symbol phase error, symbol amplitude error, carrier frequency offset, baseband packet duty cycle, baseband packet duration, time-from-last baseband transmission, and so on. AP 104 may derive the baseband parameters on a per-symbol and per-packet basis and compile/consolidate at least some of the per-symbol and/or per-frame baseband parameters into respective consolidated baseband parameters (e.g., using averaging or sampling of the per-symbol and/or per-frame baseband parameters over time, i.e., e.g. across multiple baseband packets). The baseband parameters are indicative of a self-heating signature or fingerprint of the wireless device, and by which the wireless device (or at least a type of wireless device) may be identified.

At 408, AP 104 creates for the wireless device a baseband profile including the baseband parameters. The baseband profile represents a baseband signature of the wireless device. AP 104 may also collect and/or derive additional higher-level information/signatures for the wireless device, such as a traffic pattern fingerprint, an operating system (OS) fingerprint, and combine the higher-level signatures with the baseband profile, to produce a total profile of the wireless device.

At 410, AP 104 sends the baseband profile to management entity 110 for classification of the baseband profile and storage of the baseband profile in profile database 112. AP 104 may send to management entity 112 the baseband profile alone, or the baseband profiled as combined into the total profile.

With reference to FIG. 5, there is an illustration of an example baseband profile 500 for a wireless device as generated by AP 104. As shown, baseband profile 500 stores a set of baseband parameters derived from an individual baseband packet; however, baseband profile may also include respective sets of parameters derived from respective ones of multiple baseband packets. FIG. 5 represents baseband profile 500 as a table by way of example, only. The table (500) includes columns for baseband feature type 502, feature value 504, and feature unit 506. Baseband profile 500 includes the following example parameters:

a. A media access control address (MAC) address, universal unique identifier (ID) (UUID), global unique identifier (GUID), or other address/identifier for the wireless device.

b. Timestamps, including a start time and a stop time for the baseband packet, and a time $\tau_{last}$ since a modulated packet was last transmitted.

c. Baseband packet duration.

d. Communication protocol associated with the baseband packet.

e. Received signal strength indicator (RSSI), which is a measurement of a power/amplitude of the baseband packet. This entry may also store a receiver gain state (of receiver RX and baseband processor 304) that may be applied as a correction factor in measuring the RSSI, i.e., to remove the receive gain response of AP 104 when determining RSSI.

f. Ambient temperature of an environment (e.g., local zone) in which the wireless device operates. AP 104 may receive ambient temperature measurements T (x, y, z) from a temperature sensor proximate the wireless device and that wirelessly transmits the measurements to the AP. Alternatively, AP 104 may include a local temperature sensor and receive ambient temperature measurements from the local temperature sensor.

g. Center frequency associated with the baseband packet.

h. Frequency bandwidth of the baseband packet.

i. Modulation and coding scheme used for the baseband packet.

j. Signal-to-noise-Ratio (SNR) (e.g., per subcarrier) for the baseband packet.

k. Channel State Information (CSI).

l. Carrier frequency offset (CFO) for the baseband packet.

m. Phase error per symbol (PEPS) (also referred to as "symbol timing offset"). PEPS may be measured based on tracking of pilot tones associated with symbols in the baseband packet. Each symbol includes the pilot tones that can be used for tracking/correcting phase error. The PEPS is driven by, e.g., varies as a function of, analog components of transmit section 200. Thus, the PEPS is common to (or consistent across) wireless devices having transmit sections 200 that employ the same types of analog components, while the PEPS is different between wireless devices having transmit sections that employ different types of analog components. This entry may also store phase error accumulated over multiple symbols, e.g., as $\Phi_p = [\varphi_{p,1}\ \varphi_{p,2}\ \varphi_{p,3}\ \varphi_{p,4}\ \ldots\ \varphi_{p,N}]$ for N symbols. This entry may also store phase error as a function of time since a modulated packet was last transmitted, e.g., as $\Phi_p(\sigma_{last})$.

n. IQ mismatch phase.

o. Magnitude error per symbol (MEPS) (also referred to as "IQ mismatch amplitude"). MEPS may also be measured based on tracking of the pilot tones. The gain of power amplifier 210 of transmitter section 200 of a given wireless device may vary as a function of self-heating, and pilot tone amplitude error will vary correspondingly, as observed at baseband processor 304 of AP 104. This entry may also store magnitude error accumulated over multiple symbols, e.g., as $\Phi_m = [\varphi_{m,1}\ \varphi_{m,2}\ \varphi_{m,3}\ \varphi_{m,4}\ \ldots\ \varphi_{m,N}]$ for N symbols.

p. Transient metrics.

q. Distance estimate based on RSSI.

r. Angle-of-arrival (AoA) estimate based on multi-antenna processing.

s. Data payload carried by baseband packet.

At operations 406 and 408, AP 104 also derives further baseband parameters that represent dependencies of MEPS/PEPS/CFO each as a function of (i) one or more time-related factors, such as time, baseband packet duty cycle, and time since a last modulated baseband packet was last transmitted (and thus received), and (ii) ambient temperature. The dependencies are each referred to generically as "baseband parameter response (of a baseband parameter) as a function of one or more factors." AP 104 stores the baseband parameter responses in baseband profile 500. AP 104 may derive separately:

a. Baseband parameter (MEPS/PEPS/CFO) response as a function of time.

b. Baseband parameter (MEPS/PEPS/CFO) response as a function of ambient temperature.

c. Baseband parameter (MEPS/PEPS/CFO) as a function of duty cycle.

d. Baseband parameter (MEPS/PEPS/CFO) response as a function of ambient temperature.

e. Baseband parameter (MEPS/PEPS/CFO) as a function of ambient temperature and duty cycle.

f. Baseband parameter (MEPS/PEPS/CFO) response as a function of time since last transmission and duty cycle.

Figure 6:
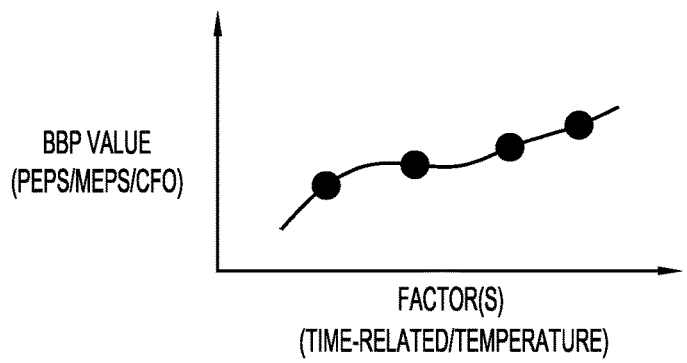
FIG. 6 shows a generic baseband parameter (BBP) response as a function of one or more factors, for a wireless device, according to an example embodiment.

FIG. 6 shows an example generic baseband parameter (BBP) response as a function of one or more factors, for a wireless device, derived by AP 104. In the example, response 600 represents a plot of baseband parameter values (e.g., (MEPS/PEPS/CFO values) against corresponding factor values (e.g., time-related factors and/or ambient temperature) for 4 points of the response (although the response may include many more points). The corresponding baseband parameter values and factor values for the 4 points of the baseband parameter response may be stored in baseband profile 500 and thus represent a plot of the baseband parameter response stored in memory. Alternatively, AP 104 may perform known or hereafter developed curve-fitting techniques on the baseband parameter response/plot to derive scalable curve-fitting coefficients representative of the response, and store the curve-fitting coefficients for the response instead of all point values of the plot of the response.

Figure 7A:
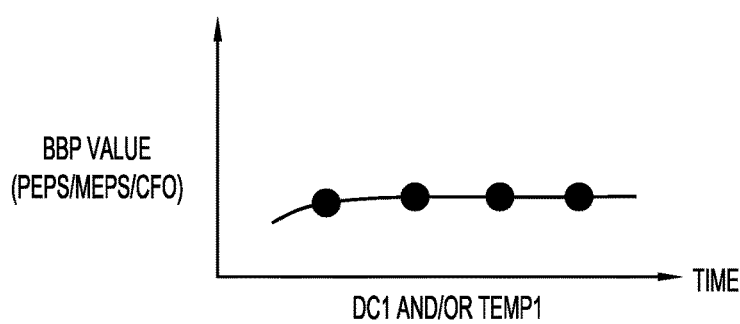
FIG. 7A shows a BBP response as a function of a first duty cycle and/or a first ambient temperature, according to an example embodiment.
Figure 7B:
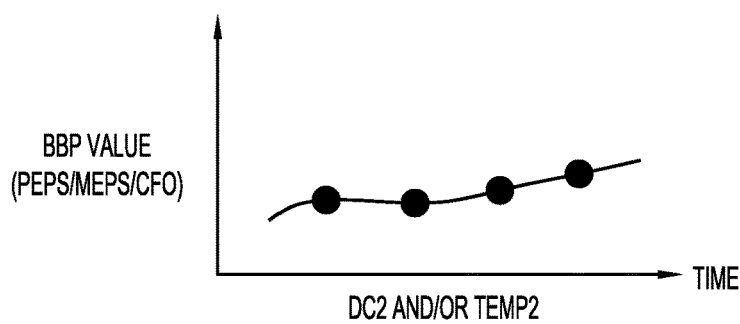
FIG. 7B shows a BBP response as a function of a second duty cycle and/or a second ambient temperature, according to an example embodiment.
Figure 7C:
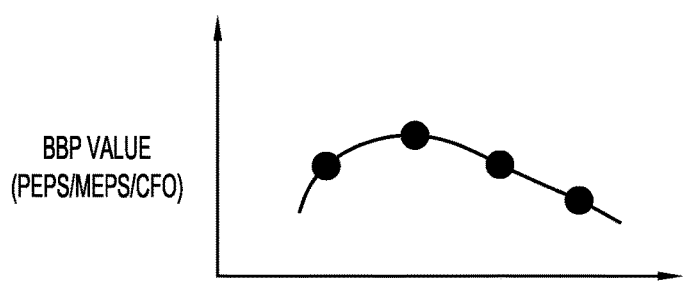
FIG. 7C shows a BBP response as a function of duty cycle or ambient temperature, according to an example embodiment.

FIGS. 7A-7C show more specific BBP responses based on the generic model of FIG. 6.

FIG. 7A shows an example BBP response as a function of a first duty cycle DC1 and/or a first temperature temp1. The BBP response shows how the baseband parameter value varies over time for the given duty cycle DC1 and/or the given temperature temp1.

FIG. 7B shows an example BBP response as a function of a second duty cycle DC2 and/or a second temperature temp 2. The BBP response shows how the baseband parameter value varies over time for the given duty cycle DC2 and/or the given temperature temp2.

FIG. 7C shows an example BBP response as a function of duty cycle or temperature. The BBP response shows how the baseband parameter value varies as the duty cycle varies or the temperature varies.

Classifying Wireless Devices

Figure 8:
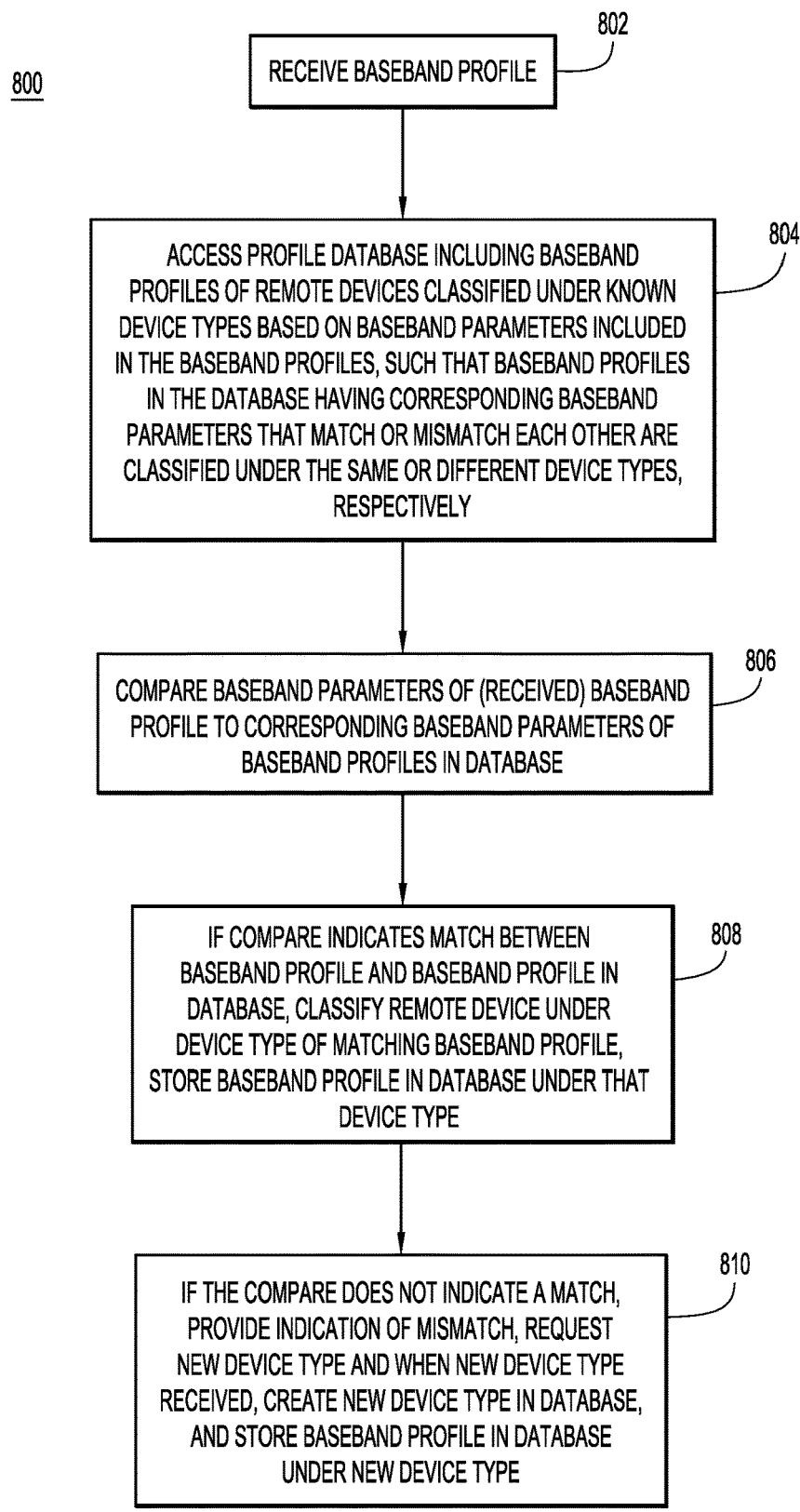
FIG. 8 is a flowchart of a method of classifying a wireless device based on a baseband profile of the wireless device as created by the AP, according to an example embodiment.

With reference to FIG. 8, there is a flowchart of an example method 800 of classifying a wireless device among wireless devices 102 based on a baseband profile of the wireless device as created by AP 104. In an embodiment, method 800 is performed by management entity 110.

At 802, management entity 110 receives from AP 104 the baseband profile for the wireless device.

At 804, management entity 110 accesses profile database 112. Profile database 112 stores baseband profiles 114 of wireless devices under known device type classifications (not shown in FIG. 1) based on/according to baseband parameters included in the baseband profiles, such that baseband profiles having corresponding baseband parameters that match or mismatch each other according to match criteria are classified under the same or different device type classifications, respectively. Thus, only the baseband profiles of the wireless devices that match each other according to the match criteria are grouped together under the same device type classification, and baseband profiles of the wireless devices that do not match each other are grouped under different device type classifications.

At 806, management entity 110 compares the baseband parameters (e.g., one or more of PEPS/MEPS/CFO, and the baseband parameter responses) of the baseband profile received from AP 104 to corresponding baseband parameters (e.g., one or more of PEPS/MEPS/CFO, and the baseband parameter responses) of each of the baseband profiles in profile database 112. The term "compare" as used herein is construed broadly to cover any classifer matching technique that may use any of (i) in-exact/close matching, such as probability matching (i.e., matching within a predetermined probability range), and matching within a predetermined tolerance range, and (ii) exact matching.

At 808, if the compare indicates a match between the baseband profile and one of the baseband profiles stored in profile database 112, management entity 110 classifies the remote device under the known device type classification of the one of the baseband profiles that matches, and stores the baseband profile in the profile database under that device type classification. A match may be indicated when the compare indicates an exact match, or when the compare indicates a match within a predetermined tolerance range. For example, a compare between CFOs may indicate a match only if the CFOs are within 100 Hz of each other, and so on.

At 810, if the compare does not indication a match between the baseband profile and any of baseband profiles 114, management entity 110:

a. Generates for display (and may display) (e.g., to an administrator) an indication of the mismatch along with identifier information (e.g., MAC address, UUID, and so on) for the remote device to which the mismatched baseband profile pertains.

b. Generates for display (and may display) a request for a new device type classification under which the remote device (and its baseband profile) may be classified.

c. Upon receiving a new device type classification, creates a new device type classification in profile database 112, and store the baseband profile of the wireless device under the new device type classification.

Method 800 is repeated over time and across wireless device 102. Management entity 112 may use machine learning (ML) techniques based on one or more ML models to refine the classifying as more and more wireless device are profiled and classified.

With reference to FIG. 9, there is an illustration of an example display page 900 generated at operation 810. Display page 900 includes a mismatch indication 902 and a request for a new device classification 904.

In another embodiment, all or most of operations 804-810 of method 800 may be performed at AP 104. For example, AP 104 may access profile database 112 directly over network 106, or store a copy of the profile database locally, and perform the accessing, the comparing, and the classifying operations described above. To the extent the classifying operations rely on machine learning, machine learning models may be downloaded to AP 104. In addition, AP 104 may be configured to perform all of some of the actions associated with operation 810.

Figure 10:
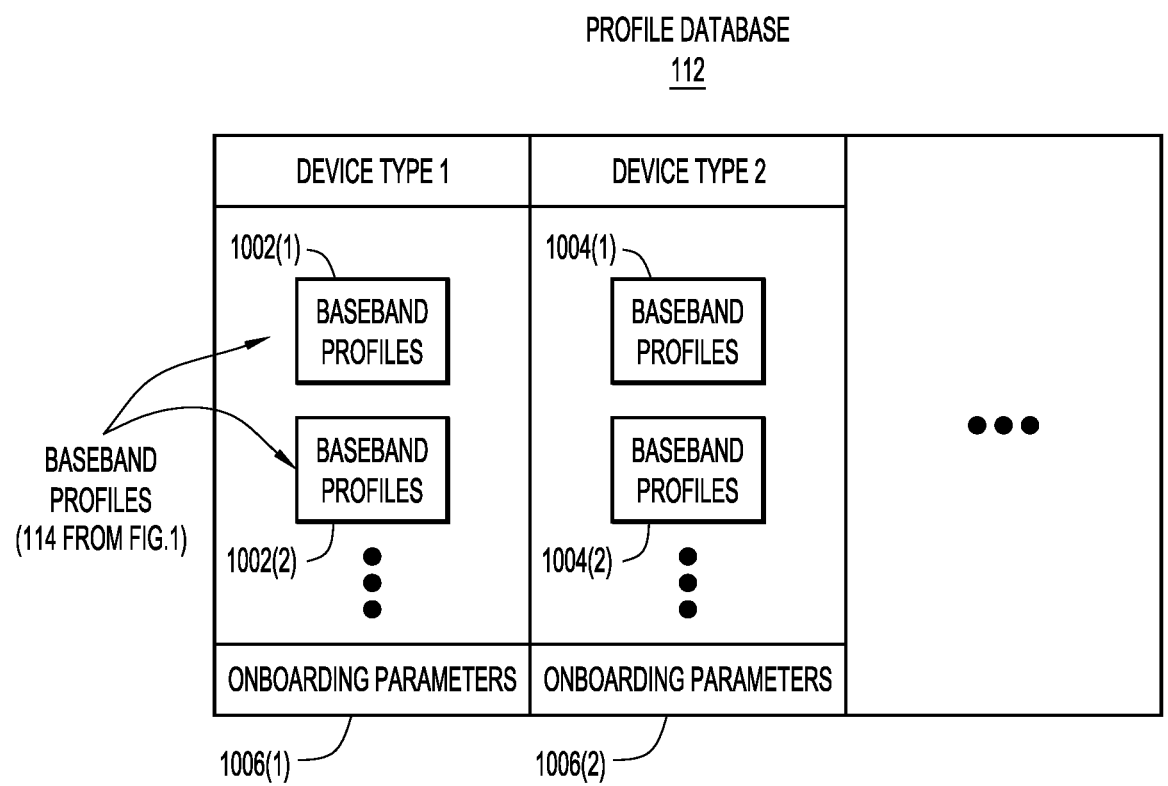
FIG. 10 is an illustration of a profile database of FIG. 1, according to an example embodiment.

FIG. 10 is an illustration of profile database 112 according to an embodiment. Profile database 112 includes device type classifications (referred to more simply as "device types") device type 1, device type 2 and so on. Baseband profiles 1002(1), 1002(2), and so on, for corresponding wireless devices, have matching corresponding baseband parameters and are, therefore, classified together and stored under device type 1. Baseband profiles 1004(1), 1004(2), and so on, for corresponding wireless devices, have matching corresponding baseband parameters and are, therefore, classified together and stored under device type 2, and so on. For example, health monitor IoT devices having similar transmit sections 200 may be grouped together under device type 1, while computer laptops having similar transmit sections 200 may be grouped together under device type 2, and so on.

Additionally, profile database 112 may also store respective predetermined onboarding parameters 1006(1), 1006(2), and so on under corresponding ones of device type 1, device type 2, and so on. Onboarding parameters 1006(1), 1006(2), and so on, are used to perform onboarding of wireless devices having baseband profiles classified under device type 1, device type 2, and so on. Onboarding is described in further detail below.

Onboarding Wireless Devices

When wireless devices 102 become active, i.e., when the wireless devices begin to transmit RF signals, embodiments presented herein perform profiling and classifying of the wireless devices as described above, and then transition to "onboarding" the wireless devices in a streamlined, generally automated manner that minimizes manual intervention. "Onboarding" of a wireless device generally refers to provisioning a controller of a particular network of wireless devices with information/credentials related to the wireless device to be onboarded to enable the controller to join the wireless device into the particular network, and/or provisioning the wireless device to be onboarded with network credentials to enable the wireless device to request to join and then join the particular network.

Figure 11:
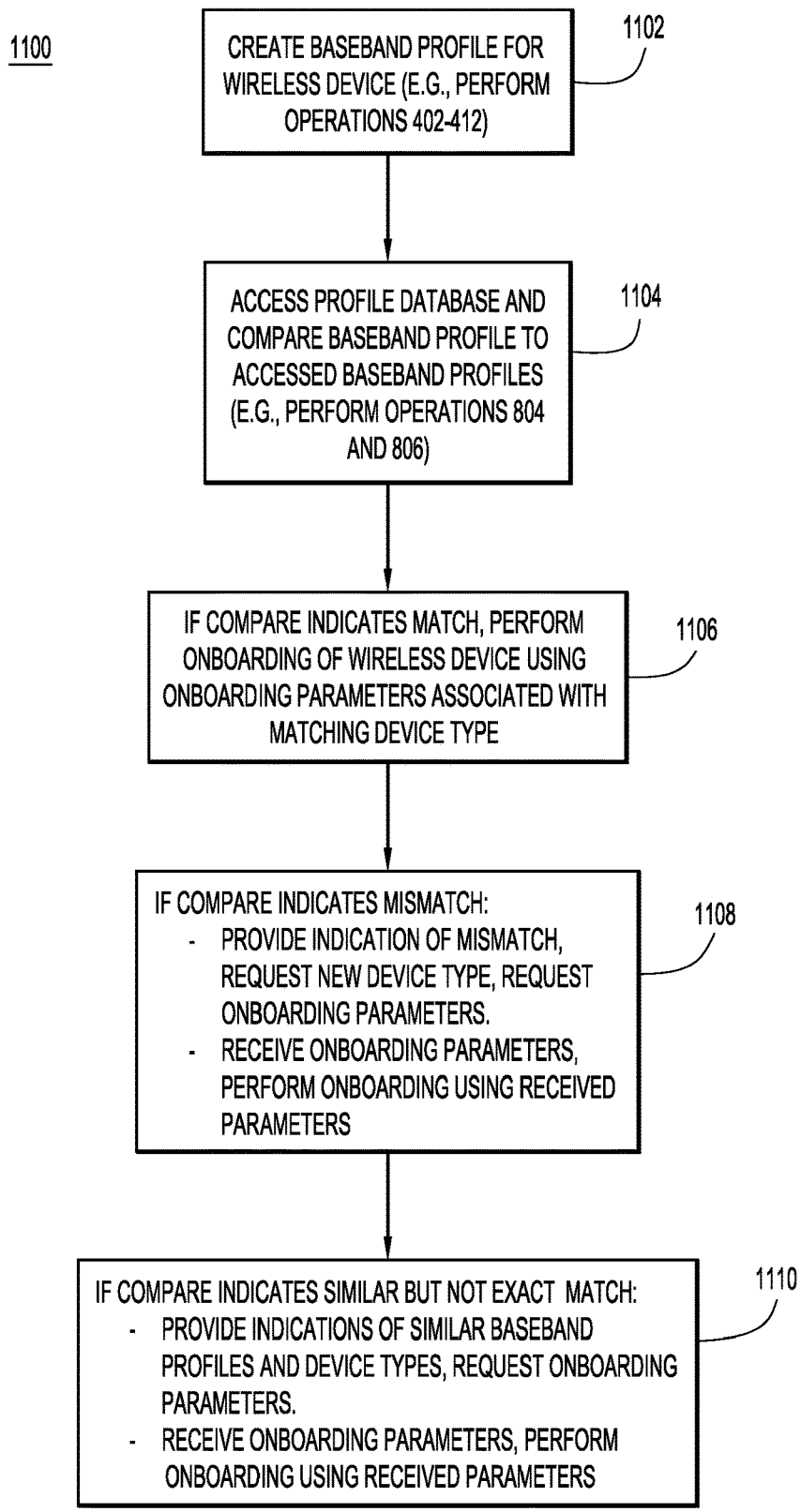
FIG. 11 is a flowchart of a method combining aspects of profiling, classifying, and onboarding of a wireless device, according to an example embodiment.

With reference to FIG. 11, there is a flowchart of an example method 1100 combining aspects of profiling, classifying, and onboarding of a wireless device. Method 1100 includes operations associated with profiling and classifying the wireless device, as described above.

At 1102, AP 104 creates a baseband profile for the wireless device and transmit the baseband profile to management entity 110. For example, AP 104 performs operations 402-412 of profiling method 400.

At 1104, management entity 110 accesses profile database 112 and compares the baseband profile to baseband profiles 114 of the profile database that are classified under the various device types. For example, management entity 110 performs operations 804 and 806 of classifying method 800.

At 1106, if the compare indicates a match, management entity 110 performs onboarding of the wireless device using predetermined onboarding information associated with, e.g., stored under, the matching device type. For example, management entity 110:

a. Accesses the predetermined onboarding information. The onboarding information or parameters may include network credentials needed by the wireless device to join a particular network associated with the matching device type. The network credentials may include one or more of an Internet Protocol (IP) address or other identifier for the particular network, a uniform resource locator (URL) used to access the particular network, a security parameters (e.g., access permissions and restrictions, and encryption keys) used to access the particular network, and so on. Alternatively, or additionally, the onboarding information may include information/parameters of the wireless device, such as a MAC ID, UUID, and so on, available in the baseband profile of the wireless device and that may be used by the particular network.

b. Provisioning the wireless device with (e.g., sending to the wireless device via AP 104) the network credentials so that the wireless device may join the particular network, and/or provisioning the particular network with the wireless device information.

At 1108, if the compare indicates a mismatch, management entity 110:

a. Generates for display (and may display) an indication of the mismatch, a request for a new device type under which the wireless device may be classified, and a request for onboarding parameters for the new device type, which may be used to perform onboarding of the wireless device.

b. Upon receipt of the requested new device type and onboarding parameters, creates a new device type, stores the baseband profile under the new device type, and performs onboarding of the wireless device using the received onboarding parameters.

At 1110, if the compare finds baseband profiles in profile database 112 that do not match the baseband profile of the wireless device exactly, but are similar to the baseband profile within a compare matching tolerance range/criterion, management entity 110 may generate for display (and may display) indications of the similar baseband profiles and the device types under which the similar baseband profiles are classified. Additionally, management entity 110 may generate for display a request for onboarding parameters (similar to operation 1108), which may be used to update profile database 112.

Also, management entity 110 may monitor the baseband profiles of baseband database 112 for the wireless devices. If the monitoring indicates a change in a baseband profile for one of the wireless devices at any point in a lifespan of the wireless device, management entity 110 generates for display (and may display) a notification that there is a possible security issue with respect to the wireless device, and may suspend data access to the wireless device.

With reference to FIG. 12, there is an illustration of an example display page 1200 generated at operation 1108(a). Display page 1200 includes a mismatch indication, a request for a new device classification, and a request for onboarding parameters.

Figure 13:
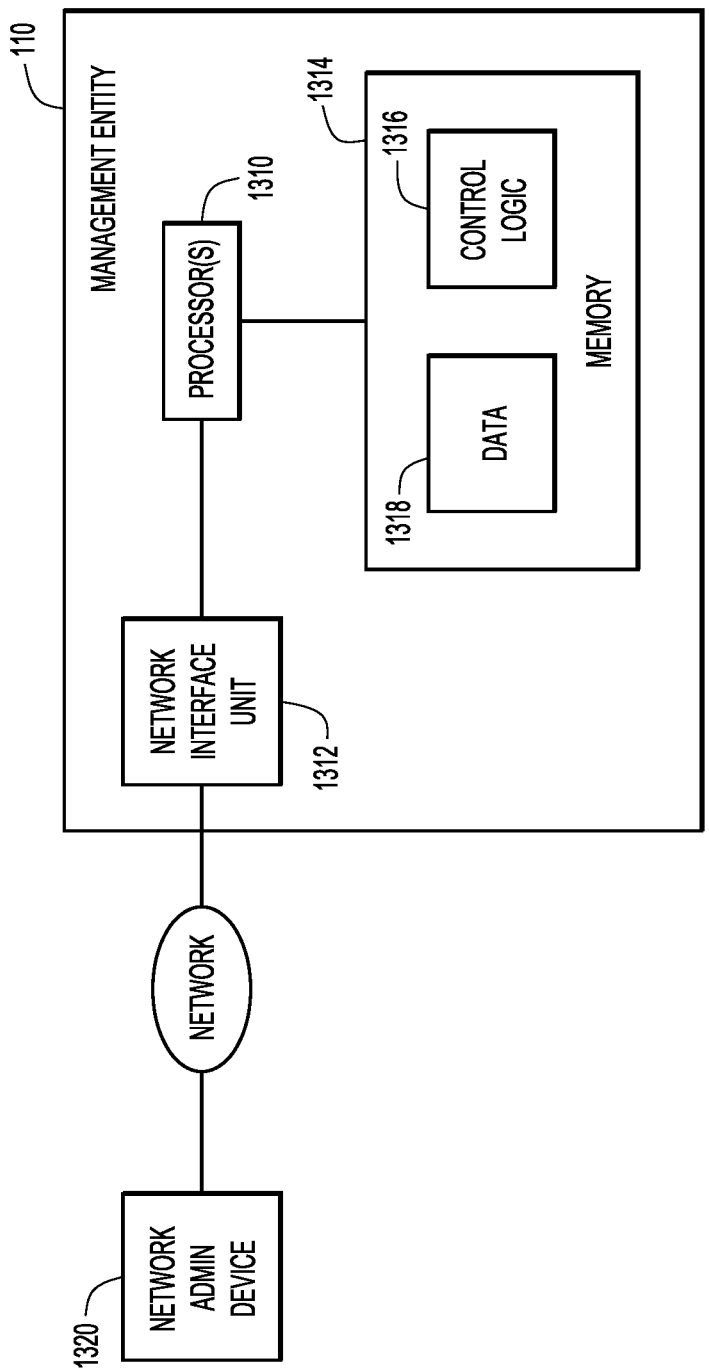
FIG. 13 is a hardware block diagram for a management entity of FIG. 1, according to an example embodiment.

With reference to FIG. 13, there is shown a hardware block diagram for management entity 110. In an example, management entity 110 includes a computer system, such as a server, having one or more processors 1310, a network interface unit (NIU) 1312, and a memory 1314. Memory 1314 stores control software 1316 (referred as "control logic"), that when executed by the processor(s) 1310, causes the computer system to perform the various operations described herein for management entity 110.

The processor(s) 1310 may be a microprocessor or microcontroller (or multiple instances of such components). The NIU 1312 enables management entity 110 to communicate over wired connections or wirelessly with a network. NIU 1312 may include, for example, an Ethernet card or other interface device having a connection port that enables management entity 110 to communicate over the network via the connection port. In a wireless embodiment, NIU 1312 includes a wireless transceiver and an antenna to transmit and receive wireless communication signals to and from the network.

The memory 1314 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1314 may comprise one or more tangible (non-transitory) computer readable storage media (e.g., memory device(s)) encoded with software or firmware that comprises computer executable instructions. For example, control software 1316 includes logic to implement methods/operations relative to management entity 110. Thus, control software 1316 implements the various methods/operations described above. Control software 1316 also includes logic to implement/generate for display graphical user interfaces (GUIs) as necessary in connection with the above described methods/operations. Memory 1314 also stores data 1318 generated and used by control software 1316, such as baseband profiles, device types, GUI information.

A user, such as a network administrator, may interact with management entity 110, to display indications and receive input, and so on, through GUIs by way of a user device 1320 (also referred to as a "network administration device") that connects by way of a network with management entity 110. The user device 1320 may be a personal computer (laptop, desktop), tablet computer, SmartPhone, etc., with user input and output devices, such as a display, keyboard, mouse, and so on. Alternatively, the functionality and a display associated with user device 1320 may be provided local to or integrated with management entity 110.

Figure 14:
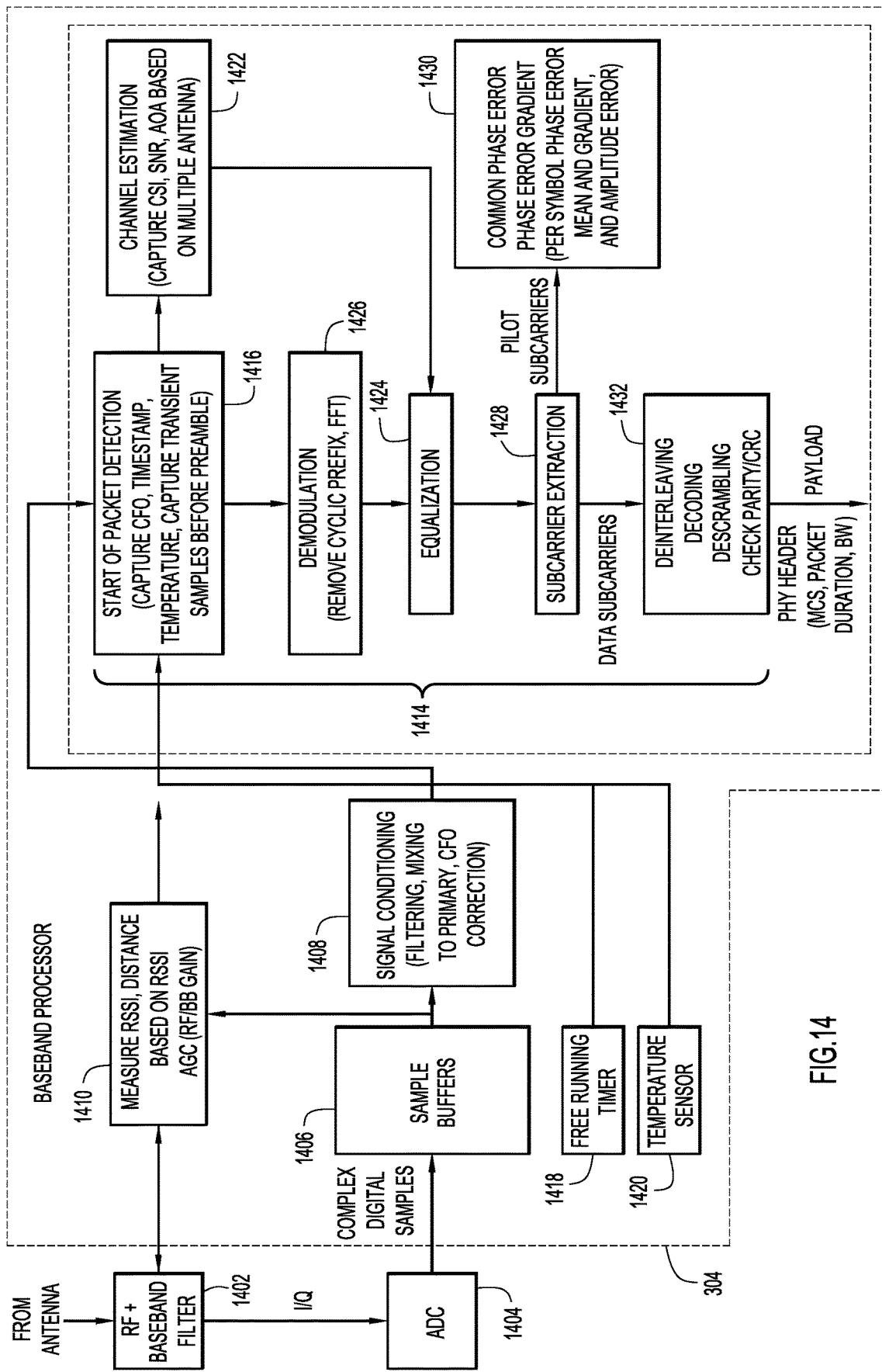
FIG. 14 is a block diagram of a baseband processor of the AP, according to an example embodiment.

FIG. 14 is a block diagram of baseband processor 304 of AP 104, according to an embodiment. An RF and baseband filter module 1402, and an analog-to-digital converter (ADC) 1404 of receiver RX deliver digital baseband in-phase (I) and quadrature (Q) (IQ) samples (also referred to as complex digital samples) of baseband packets (e.g., baseband PPDUs) to an input of baseband processor 304. In the case of baseband PPDUs, the IQ samples represent IQ samples of symbols and carrier frequencies/tones associated with the symbols. Sample buffers 1406 buffer the IQ samples and provide them to a signal conditioner 1408 and a measurement module 1410. Signal conditioner 1408 filters and corrects the IQ samples for CFO, to produce conditioned IQ samples. Measurement module 1410 (i) measures RSSI and a distance between AP 104 and a wireless device that generated the packets based on the RSSI, and (ii) derives an automatic gain control (AGC) feedback signal to control RF and baseband gain.

Signal conditioner 1408 provides the conditioned IQ samples to a baseband packet decoder/demodulator chain 1414. A start-of-packet detector 1416 captures/derives the CFO, timestamps the baseband packets using free running timer 1418, acquires an ambient temperature measurement from a temperature sensor 1420, and captures transient samples from preambles of the baseband packets. Detector 1416 provides information to a channel estimator 1422. Based on the information, channel estimator 1422 captures CSI, derives a SNR for each of the baseband packets, and derives the AoA for each of the packets based on multiple antenna inputs. Channel estimator 1422 outputs channel estimates to an equalizer 1424.

A demodulator 1426 demodulates symbols of the baseband packets, removes cyclic prefixes, and performs Fast Fourier Transforms (FFTs). Equalizer 1424 equalizes the demodulated data from demodulator 1426 based on outputs from channel estimator 1422. A subcarrier extractor 1428 extracts subcarriers from the symbols, and provides the subcarriers to a phase error module 1430. Phase error module derives a per-symbol phase error and per-symbol amplitude error, and accumulates phase errors and amplitudes.

Post processing module 1432 performs deinterleaving, decoding, and descrambling of the demodulated data. Module 1432 also performs a parity check and a cyclic redundancy check (CRC). Post processing module outputs a PHY header (modulation and coding scheme) MCS, a packet duration, and a packet frequency bandwidth.

Baseband processor 304 provides the above-described baseband parameters derived by the baseband processor modules to AP controller 306, which compiles the baseband parameters into a baseband profile.

In summary, embodiments collect baseband profiles from wireless devices to streamline onboarding of the wireless devices in various applications. The baseband profile of a wireless device includes multiple baseband parameters extracted from decoding of a baseband PPDU transmitted by the wireless device. The decoding may include start of packet detection to forward error correction and CRC check, for example. From the baseband profile may be used to automatically identify particular device types for the wireless devices and, which are turn automatically onboarded.

In one aspect, a method is provided comprising: wirelessly receiving modulated radio frequency (RF) packets from a wireless device; converting the modulated RF packets to modulated baseband packets; deriving baseband parameters from the modulated baseband packets; creating for the wireless device a baseband profile including the baseband parameters; accessing a database including baseband profiles of wireless devices classified under known device types based on baseband parameters included in the baseband profiles, such that baseband profiles having corresponding baseband parameters that match or mismatch each other are classified under the same or different device types in the database, respectively; comparing the baseband parameters of the baseband profile to corresponding baseband parameters of the baseband profiles in the database; and if the comparing indicates a match between the baseband profile and one of the baseband profiles: classifying the wireless device under the known device type of the one of the baseband profiles, and storing the baseband profile in the database under the known device type.

In another aspect, a method is provided comprising: at a cloud-based management entity configured to communicate over a network with a wireless access point configured to wirelessly receive modulated radio frequency (RF) packets from a wireless device: receiving from the access point a baseband profile including baseband parameters derived by the access point from the modulated RF packets; accessing a database including baseband profiles of wireless devices classified under known device types based on baseband parameters included in the baseband profiles, such that baseband profiles in the database having corresponding baseband parameters that match or mismatch each other are classified under the same or different device types, respectively; comparing the baseband parameters of the baseband profile to corresponding baseband parameters of the baseband profiles in the database; and if the comparing indicates a match between the baseband profile and one of the baseband profiles: classifying the wireless device under the known device type of the one of the baseband profiles, and storing the baseband profile in the database under the device type.

In yet another aspect, an apparatus is provided comprising: a radio to wirelessly receive modulated radio frequency (RF) packets from a wireless device, and to convert the modulated RF packets to modulated baseband packets; a baseband processor coupled to the radio and configured to derive baseband parameters from the modulated baseband packets; and a processor coupled to the baseband processor and configured to: create for the wireless device a baseband profile including the baseband parameters; access a database including baseband profiles of wireless devices classified under known device types based on baseband parameters included in the baseband profiles, such that baseband profiles having corresponding baseband parameters that match or mismatch each other are classified under the same or different device types in the database, respectively; compare the baseband parameters of the baseband profile to corresponding baseband parameters of the baseband profiles in the database; and if the compare indicates a match between the baseband profile and one of the baseband profiles: classify the wireless device under the known device type of the one of the baseband profiles, and store the baseband profile in the database under the known device type.

In yet another aspect, non-transitory computer readable media encoded with instructions are provided. The instructions, when executed by a processor and/or a baseband processor, cause the processor and/or the baseband processor to perform each of the methods presented herein.

The above description is intended by way of example only. Various modifications and structural changes may be made therein without departing from the scope of the concepts described herein and within the scope and range of equivalents of the claims.

What is claimed is:

1. A method comprising:
wirelessly receiving modulated radio frequency (RF) packets from a wireless device;
converting the modulated RF packets to modulated baseband packets;
deriving baseband parameters from the modulated baseband packets;
creating for the wireless device a baseband profile including the baseband parameters;
accessing a database including baseband profiles of wireless devices classified under known device types based on baseband parameters included in the baseband profiles, such that baseband profiles having corresponding baseband parameters that match or mismatch each other are classified under the same or different ones of the known device types in the database, respectively, the database including onboarding parameters classified under the known device types, the onboarding parameters including network credentials for use by the known device types to access networks;
comparing the baseband parameters of the baseband profile to corresponding baseband parameters of the baseband profiles in the database; and
if the comparing indicates a match between the baseband profile and one of the baseband profiles:
classifying the wireless device under a known device type of the one of the baseband profiles; and
automatically onboarding the wireless device by provisioning the wireless device with the onboarding parameters of the known device type to enable the wireless device to access a particular network.

2. The method of claim 1, wherein:
the converting includes converting the modulated RF packets to the modulated baseband packets to include baseband in-phase (I) and quadrature (Q) samples of symbols and carrier frequencies of the modulated baseband packets; and
the deriving includes deriving from the baseband I and Q samples the baseband parameters to include carrier frequency offset, symbol phase error, and symbol amplitude error.

3. The method of claim 2, wherein:
the deriving further includes generating, for the baseband profile, a baseband parameter response that represents variation of the one of baseband parameters as a function of a time-related factor; and
the comparing includes comparing the baseband parameter response of the baseband profile to a corresponding baseband parameter response in each of the baseband profiles.

4. The method of claim 3, wherein the generating the baseband parameter response includes generating the baseband parameter response for the carrier frequency offset, the symbol phase error, or the symbol amplitude error as the function of the time-related factor.

5. The method of claim 3, wherein the time-related factor includes time, baseband packet duty cycle, or time-since-last baseband packet transmission.

6. The method of claim 3, further comprising:
receiving from a temperature sensor an indication of an ambient temperature of an environment in which the wireless device operates,
wherein the generating the baseband parameter response includes generating the baseband parameter response as the function of the time-related factor and the ambient temperature.

7. The method of claim 1, wherein the
onboarding parameters of the known device type include one or more of an Internet Protocol (IP) address for the particular network, a uniform resource locator (URL) used to access the particular network, and security parameters used to access the particular network.

8. The method of claim 1, further comprising, if the comparing does not indicate the match:
providing (i) an indication that the wireless device does not match any known device type, and (ii) a request for a new device type under which the wireless device is to be classified in the database; and
upon receiving the new device type, classifying the wireless device under the new device type.

9. The method of claim 8, further comprising, if the comparing does not indicate the match:
providing to a user a request for onboarding parameters associated with the new device type; and
onboarding the wireless device based on the onboarding parameters associated with the new device type.

10. A method comprising:
at a cloud-based management entity configured to communicate over a network with a wireless access point configured to wirelessly receive modulated radio frequency (RF) packets from a wireless device:
receiving from the wireless access point a baseband profile including baseband parameters derived by the wireless access point from the modulated RF packets;
accessing a database including baseband profiles of wireless devices classified under known device types based on baseband parameters included in the baseband profiles, such that baseband profiles in the database having corresponding baseband parameters that match or mismatch each other are classified under the same or different ones of the known device types, respectively, the database including onboarding parameters classified under the known device types, the onboarding parameters including network credentials for use by the known device types to access networks;
comparing the baseband parameters of the baseband profile to corresponding baseband parameters of the baseband profiles in the database; and
if the comparing indicates a match between the baseband profile and one of the baseband profiles:
classifying the wireless device under a known device type of the one of the baseband profiles; and
automatically onboarding the wireless device by provisioning the wireless device with the onboarding parameters of the known device type to enable the wireless device to access a particular network.

11. The method of claim 10, wherein:
the baseband parameters of the baseband profile include carrier frequency offset, symbol phase error, and symbol amplitude error derived by the wireless access point from symbols and carrier frequencies of modulated baseband packets corresponding to the modulated RF packets; and
the comparing includes comparing the carrier frequency offset, the symbol phase error, or the symbol amplitude error of the baseband profile to a corresponding one of carrier frequency offset, symbol phase error, or symbol amplitude error of each of the baseband profiles.

12. The method of claim 11, wherein:
the baseband profile includes a baseband parameter response for a baseband parameter including the carrier frequency offset, the symbol phase error, or the symbol amplitude error that represents variation of the baseband parameter as a function of a time-related factor; and
the comparing includes comparing the baseband parameter response of the baseband profile to a corresponding baseband parameter response in each of the baseband profiles.

13. The method of claim 12, wherein the time-related factor includes time, baseband packet duty cycle, or time-since-last baseband packet transmission.

14. The method of claim 10, wherein the onboarding parameters of the known device type include one or more of an Internet Protocol (IP) address for the particular network, a uniform resource locator (URL) used to access the particular network, and security parameters used to access the particular network.

15. The method of claim 14, further comprising, if the comparing does not indicate the match:
providing (i) an indication that the wireless device does not match any known device type, and (ii) a request for a new device type under which the wireless device is to be classified in the database; and
upon receiving the new device type, classifying the wireless device under the new device type.

16. An apparatus comprising:
a radio to wirelessly receive modulated radio frequency (RF) packets from a wireless device, and to convert the modulated RF packets to modulated baseband packets;
a baseband processor coupled to the radio and configured to derive baseband parameters from the modulated baseband packets; and
a processor coupled to the baseband processor and configured to:
create for the wireless device a baseband profile including the baseband parameters;
access a database including baseband profiles of wireless devices classified under known device types based on baseband parameters included in the baseband profiles, such that baseband profiles having corresponding baseband parameters that match or mismatch each other are classified under the same or different ones of the known device types in the database, respectively, the database including onboarding parameters classified under the known device types, the onboarding parameters including network credentials for use by the known device types to access networks;
compare the baseband parameters of the baseband profile to corresponding baseband parameters of the baseband profiles in the database; and
if the compare indicates a match between the baseband profile and one of the baseband profiles:
classify the wireless device under a known device type of the one of the baseband profiles; and
automatically onboard the wireless device by provisioning the wireless device with the onboarding parameters of the known device type to enable the wireless device to access a particular network.

17. The apparatus of claim 16, wherein:
the radio is configured to convert by converting the modulated RF packets to the modulated baseband packets to include baseband in-phase (I) and quadrature (Q) samples of symbols and carrier frequencies of the modulated baseband packets; and
the baseband processor is configured to derive by deriving from the baseband I and Q samples the baseband parameters to include carrier frequency offset, symbol phase error, and symbol amplitude error.

18. The apparatus of claim 17, wherein:
the baseband processor is further configured to derive by generating, for the baseband profile, a baseband parameter response that represents variation of one of the baseband parameters as a function of a time-related factor; and
the processor is configured to compare by comparing the baseband parameter response of the baseband profile to a corresponding baseband parameter response in each of the baseband profiles.

19. The apparatus of claim 18, wherein the baseband processor is configured to generate the baseband parameter response by generating the baseband parameter response for the carrier frequency offset, the symbol phase error, or the symbol amplitude error as the function of the time-related factor.

20. The apparatus of claim 18, wherein the time-related factor includes time, baseband packet duty cycle, or time-since-last baseband packet transmission.

* * * * *